United States Patent
Komatsu (10) Patent No.: US 8,673,033 B2
(45) Date of Patent: Mar. 18, 2014

(54) DISPLAY CONTROL CIRCUIT AND PROJECTOR APPARATUS

(75) Inventor: Yoshikazu Komatsu, Kanagawa (JP)

(73) Assignee: Sony Corporation, Tokyo (JP)

( * ) Notice: Subject to any disclaimer, the term of this patent is extended or adjusted under 35 U.S.C. 154(b) by 279 days.

(21) Appl. No.: 13/238,132

(22) Filed: Sep. 21, 2011

(65) Prior Publication Data

US 2012/0120211 A1    May 17, 2012

(30) Foreign Application Priority Data

Nov. 12, 2010  (JP) ................................ P2010-254145

(51) Int. Cl.
- *H04N 13/04* (2006.01)
- *G03B 21/14* (2006.01)

(52) U.S. Cl.
USPC .............................................. 48/56; 353/98

(58) Field of Classification Search
USPC .......................................................... 348/56
See application file for complete search history.

(56) References Cited

U.S. PATENT DOCUMENTS

| 6,181,303 | B1* | 1/2001 | Johnson et al. ................... 345/7 |
| 7,019,792 | B2* | 3/2006 | Kimura ......................... 348/744 |
| 8,066,377 | B1* | 11/2011 | Husak et al. ...................... 353/7 |
| 2010/0194857 | A1* | 8/2010 | Mentz et al. .................... 348/43 |

FOREIGN PATENT DOCUMENTS

| JP | 8-505031 | 5/1996 |
| JP | 2003-1023030 | 4/2003 |
| JP | 2007-194950 | 8/2007 |
| WO | WO 95/11572 | 4/1995 |

* cited by examiner

*Primary Examiner* — Sath V Perungavoor
*Assistant Examiner* — Howard D Brown, Jr.
(74) *Attorney, Agent, or Firm* — Wolf, Greenfield & Sacks, P.C.

(57) ABSTRACT

A display control circuit includes a device driving unit that alternately writes a left video image and a right video image in a time-division manner to a light modulating device, a light source driving unit that increases or reduces the brightness of a light source that emits light passing through the light modulating device, a shutter eyeglass driving unit that provides shutter eyeglasses with a shutter driving signal, and a control unit that instructs the light source driving unit to reduce the brightness of the light source in the duration of a switchover between the left video image and the right video image for the light modulating device or instructs the light source driving unit to increase the brightness of the light source in the duration in which the left video image or the right video image is written solely to the light modulating device.

20 Claims, 7 Drawing Sheets

DISPLAY CONTROL CIRCUIT AND PROJECTOR APPARATUS

BACKGROUND

The present disclosure relates to a display control circuit and projector apparatus that are applied preferably to displaying of 3D video images in a time-division manner.

There has been a related-art technique for generating a stereoscopic video image (referred to below as a 3D video image) that provides the user with a stereoscopic view by using the video images of a single subject taken by two cameras disposed according to the parallax between the left and the right eyes of the user. The video images taken by the two cameras are called a left video image for a left eye and a right video image for a right eye (the left video image and the right video image are also correctively referred to below as the left and right video images).

The user can use a 3D display apparatus or projector apparatus that projects video images onto a screen to see 3D video images. These display apparatuses display the left and right video images in a time-division manner on a display surface in combination with shutter eyeglasses incorporating liquid crystal shutters. The left video image and the right video image partially overlap each other while a switchover between the video images on the liquid crystal panel of the projector apparatus is performed or the motion of a video image is delayed due to the response speed of the liquid crystal panel. To prevent this overlap, the liquid crystal shutters of liquid crystal shutter eyeglasses are closed (turned off) in the duration of a switchover between the left and right video images in order to prevent light from entering the user's left and right eyes through the left and right lenses of the shutter eyeglasses.

Japanese Unexamined Patent Application Publication No. 2003-102030 discloses a technique for projecting color-separated light in a time-division manner from a light source by changing the strength of the color selected by a color separator.

SUMMARY

In the shutter eyeglasses used in the display apparatus described above, the liquid crystal shutters are closed in the duration of a switchover between the left and right video images, so the duration in which the left and right lenses are turned on is less than half the duration in which 3D video images is displayed. Accordingly, in the duration in which the left and right lenses are turned off, since light that reaches the shutter eyeglasses is not used, the user sees darker 3D video images than it really is. On the other hand, for the user to see brighter 3D video images, the light source of the display apparatus is preferably larger and brighter than the light source of the related art, so the power consumption of the light source becomes larger.

It is desirable to prevent the brightness of the left and right video images displayed in a time-division manner from being reduced.

An embodiment according to the present disclosure includes a device driving unit that alternately writes a left video image for a left eye and a right video image for a right eye in a time-division manner to a light modulating device, based on a time-division stereoscopic video data having the left video image and the right video image.

The embodiment according to the present disclosure further includes a light source driving unit that increases or reduces the brightness of a light source that emits light passing through the light modulating device and a shutter eyeglass driving unit that provides shutter eyeglasses for which liquid crystal shutters are opened or closed by a shutter driving signal with the shutter driving signal.

The embodiment according to the present disclosure further includes a control unit that instructs the light source driving unit to reduce the brightness of the light source in the duration of a switchover between the left video image and the right video image for the light modulating device or instructs the light source driving unit to increase the brightness of the light source in the duration in which the left video image or the right video image is written solely to the light modulating device.

With this, it is possible to reduce the brightness of the light source in the duration of a switchover in which the left and right video images overlap each other or increase the brightness of the light source in the duration in which the left or right video image is written solely.

According to an embodiment of the present disclosure, when the left and right video images are displayed alternately in a time-division manner, the brightness of the light source is changed between the duration of a switchover in which the left and right video images overlap each other and the duration in which the left or right video image is displayed solely. With this, the user can see 3D video images with high brightness based on clear left and right video images in order to keep the power consumption of the light source to a level similar to a light source of the related art.

DETAILED DESCRIPTION OF EMBODIMENTS

Embodiments of the present disclosure will be described in the following order.

1. Embodiment (Light source brightness control: Example when the liquid crystal response time is not considered)
2. Another embodiment (Light source brightness control: Example when the liquid crystal response time is considered)
3. Modification

1. Embodiment

[Example when the Liquid Crystal Response Time is Not Considered]

An embodiment of the present disclosure will be described with reference to FIGS. 1 to 5, 6A to 6C, and 7A to 7C. In the embodiment, an example (referred to below as this example) of application to a 3D display system 10 including a projector apparatus 1, which alternately projects left and right video images onto a screen 13 in a time-division manner, and shutter eyeglasses 21.

Figure 1:
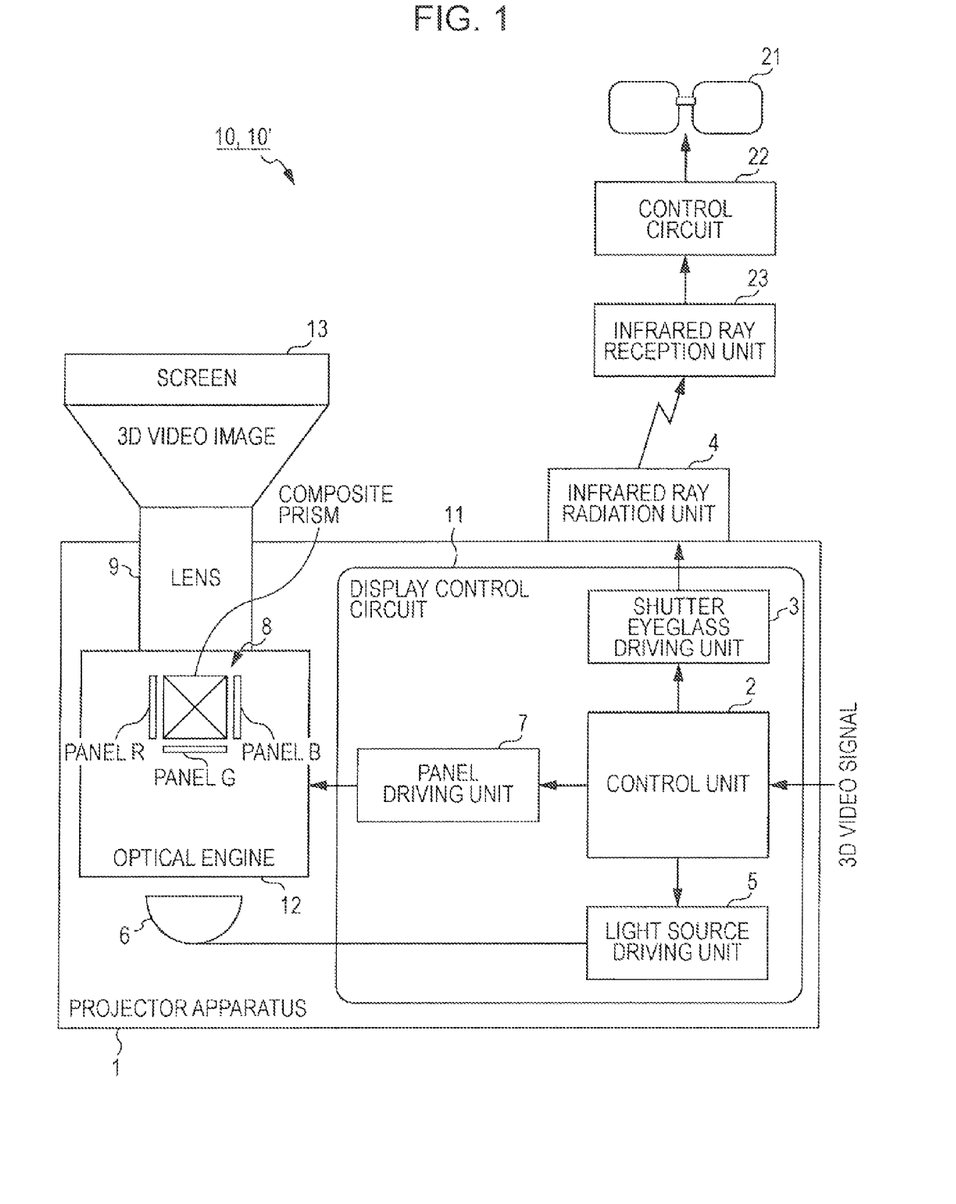
FIG. 1 is a block diagram showing an example of the internal structure of a 3D display system according to an embodiment of the present disclosure.

FIG. 1 shows an example of the internal structure of the 3D display system 10.

The 3D display system 10 includes a projector apparatus 1, which projects left and right video images (3D video images) onto a screen 13, and shutter eyeglasses 21 for which the liquid crystal shutters of left and right lenses are turned on or off in a time-division manner.

The projector apparatus 1 includes a display control circuit 11, which controls the displaying of left and right video images, an infrared ray radiation unit 4, which emits a infrared ray to the shutter eyeglasses 21, a light source 6, whose brightness is changed under control of the display control circuit 11 and which emits light to be projected onto the screen 13. The projector apparatus 1 includes an optical engine 12, which emits light originating from the light source 6 as 3D video light. The optical engine 12 includes liquid crystal panels 8, which performs a switchover between left and right video images under control of the display control circuit 11, and a lens 9, which enlarges a video image represented by light passing through the liquid crystal panels 8 at a predetermined magnification and projects the video image onto the screen 13.

In this example, the liquid crystal panels 8 are used as a light modulating device to which a left video image and a right video image are written alternately in a time-division manner. The light source 6 emits light that passes through the liquid crystal panels 8 and is projected onto the screen 13. The optical engine 12, which includes liquid crystal panels 8 and a composite prism, receives an instruction from the display control circuit 11 and outputs, as light's three primary colors, light emitted through the R, G, and B liquid crystal panels 8 disposed on the composite prism by the light source 6.

The display control circuit 11 includes a control unit 2, which controls the output of a 3D video signal inputted from an external video reproduction apparatus. The display control circuit 11 further includes a shutter eyeglass driving unit 3, which outputs a shutter driving signal instructing the driving of the liquid crystal shutters of the left and right lenses of the shutter eyeglasses 21. The display control circuit 11 further includes a light source driving unit 5, which increases or reduces the brightness of the light source 6 receiving a instruction from the control unit 2 and emitting light passing through the liquid crystal panels 8, and a panel driving unit 7, which receives a instruction from the control unit 2 and drives the liquid crystal panels 8. The panel driving unit 7 is used as a device driving unit that drives a light modulating device (the liquid crystal panels 8 in this example). The panel driving unit 7 alternately writes a left video image for a left eye and a right video image for a right eye to the liquid crystal panels 8 in a time-division manner on the basis of time-division stereoscopic video data (3D video signal) including the left video image and the right video image.

The control unit 2 instructs the light source driving unit 5 to reduce the brightness of the light source 6 in the duration of a switchover between the left and right video images on the liquid crystal panels 8 and instructs the light source driving unit 5 to increase the brightness of the light source 6 in the duration in which the left or right video image is written solely to the liquid crystal panels 8. The shutter driving signal provided by the shutter eyeglass driving unit 3 is transmitted to the shutter eyeglasses 21 by wire or wireless. In this example, since the shutter driving signal is transmitted by wireless, an infrared signal obtained by optical-to-electrical conversion of the shutter driving signal is used.

The shutter eyeglass driving unit 3 provides the infrared ray radiation unit 4 with the shutter driving signal that drives the liquid crystal shutters of the shutter eyeglasses 21 for which liquid crystal shutters are opened or closed by the shutter driving signal. The infrared ray radiation unit 4 converts the shutter driving signal into an infrared signal and transmits the converted signal to the shutter eyeglasses 21 by emitting it in a predetermined pattern.

The shutter eyeglasses 21 includes an infrared ray reception unit 23, which performs optical-to-electrical conversion of an infrared signal received from the infrared ray radiation unit 4 into a shutter driving signal, and a control circuit 22, which turns on or off the left and right lens units of the shutter eyeglasses 21 solely according to the shutter driving signal. The shutter eyeglasses 21 have a liquid crystal shutter disposed in each of the left and right lens units, and open (turns on) the shutter of the left lens when the user sees a left video image and close (turns off) the shutter of the right lens. On the other hand, the shutter eyeglasses 21 open (turns on) the shutter of the right lens when the user sees the right video image and close (turns off) the shutter of the left lens. Since the left video image enters the user's left eye and the right video image enters the user's right eyes alternately at short time intervals, the user recognizes these video images as 3D video images.

Figure 2:
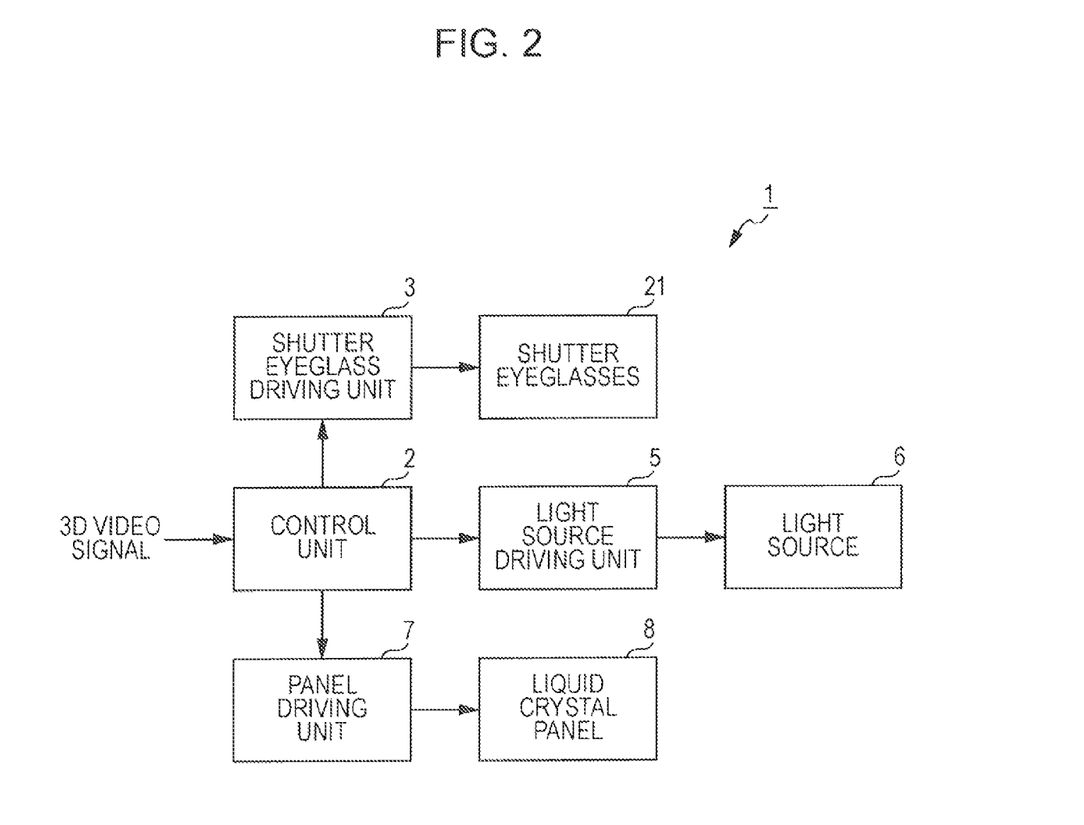
FIG. 2 is a block diagram showing an example of the internal structure of a projector apparatus according to the embodiment of the present disclosure.

FIG. 2 is shows an example of the internal structure of the projector apparatus 1.

The projector apparatus 1 projects a video image on the light modulating device onto the screen 13 through the lens 9 by an optical system that radiates the light modulating device with light from the light source by using the liquid crystal panels 8 of reflective or transmissive type as a light modulating device that modulates the video light of left and right video images based on 3D video signals. At this time, the projector apparatus 1 displays 3D video images on the screen 13 in a time-division manner and increases the brightness of the video image projected onto the screen 13 by controlling the brightness of the light source.

3D video signals including left and right video images are inputted to the control unit 2. The control unit 2 writes the right video image and the left video image alternately to the liquid panels 8 through the panel driving unit 7, and turns on or off the left and right lenses of the shutter eyeglasses 21 through the shutter eyeglass driving unit 3 at the timing at which the video images are written. At the same time, the control unit 2 lets the light source driving unit 5 control the brightness of the light source 6 by transmitting a brightness control signal for increasing or reducing the brightness to the light source driving unit 5. In this way, the control unit 2 controls the brightness of the light source 6 and the timing of a switchover between the liquid crystal shutters of the shutter eyeglasses 21 at the timing of a switchover between left and right video images.

Figure 3:
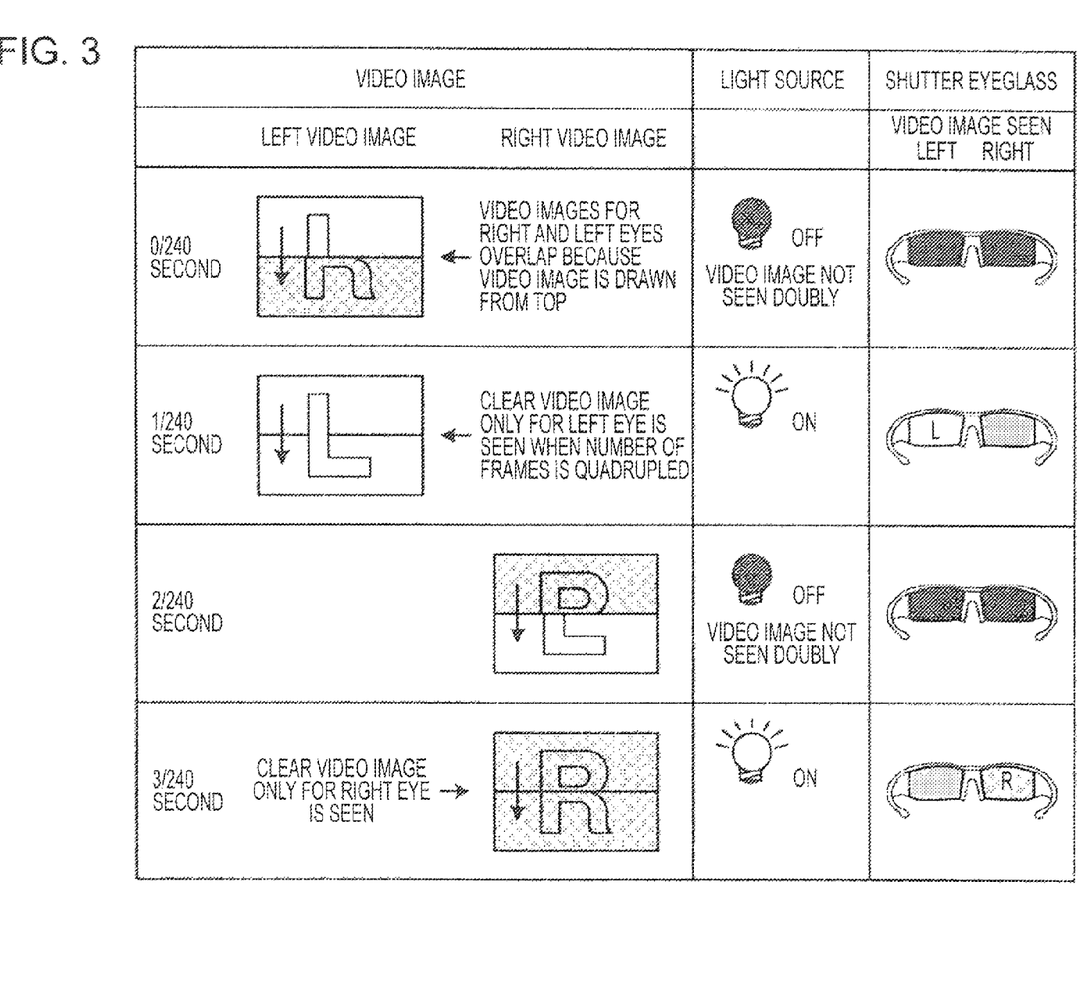
FIG. 3 is the structural diagram showing an example of operation of the projector apparatus according to the embodiment of the present disclosure.

FIG. 3 shows an example of operation when the projector apparatus 1 displays 3D video images including left and right video images by performing time division every $1/240$ second.

The projector apparatus 1 generally writes 60 frames of the left video image and 60 frames of the right video image per second, that is, a total of 120 frames per second. However, a switchover between the left and right video images is not performed for a brief moment. For example, the switchover is performed from the upper left to the lower right while the left and right video images are displayed at the same time. Accordingly, crosstalk in which the left and right video images overlap each other is likely to occur during the switchover between the left and right video images. The projector apparatus 1 in this example replays 120 frames of left video images and 120 frames of right video images (a total of 240 frames, twice as much as normal), writes the left video image and the right video images immediately twice, and controls the brightness of the light source 6 that includes LEDs for each frame in order to display clear 3D video images.

First, an example of the initial state in which the left video image is being written to the right video image.

Since the left video image is written from the upper side in this case, the left video image overlaps with the right video image, which is already displayed, in the switchover period. The light source 6 and the left and right lenses of the shutter eyeglasses 21 are turned off to prevent the video image from being seen doubly by the user. This prevents light from reaching both eyes of the user.

FIG. 3 next shows an example of a state after a lapse of $1/240$ second from the initial state.

As compared with a normal video image with 60 frames per second, a video image with 240 frames per second makes the left video image clear after a lapse of $1/240$ second. At this time, because the light source 6 is, turned on and light passes through the left lens of the shutter eyeglasses 21, the user can recognize the left video image with high brightness.

FIG. 3 next shows an example of a state after a lapse of $2/240$ seconds from the initial state.

Since the right video image is written from the upper side as described above, the right video image overlaps with the left video image, which is already displayed, in the switchover period. The light source 6 and the left and right lenses of the shutter eyeglasses 21 are turned off to prevent the video image from being seen doubly by the user. This prevents light from reaching both eyes of the user.

FIG. 3 next shows an example of a state after a lapse of $3/240$ seconds from the initial state.

After a lapse of $3/240$ seconds from the initial state, the right video image is displayed clearly. At this time, because the light source 6 is turned on and light passes through the right lens of the shutter eyeglasses 21, the user can recognize the right video image with high brightness.

Figure 4:
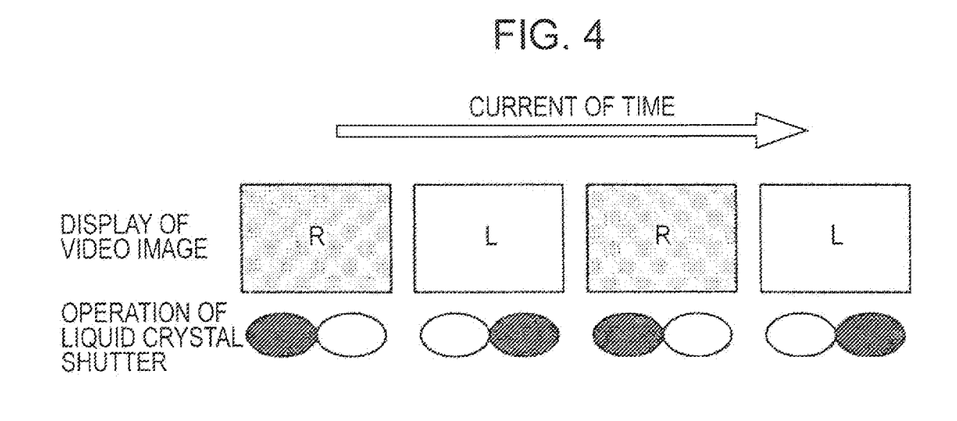
FIG. 4 illustrates the displaying of left and right video images and an example of operation of liquid crystal shutters in an ideal state according to the embodiment of the present disclosure.

FIG. 4 illustrates the displaying of left and right video images and an example of operation of liquid crystal shutters in an ideal state.

To display 3D video images in a time-division manner, the right video image and the left video image are alternately displayed. Since it is sufficient for the right video image to reach only the right eye and for the left video image to reach only the left eye, the shutter eyeglasses 21 that can transmit or interrupt light in sync with the left and right video images switched alternately. While the left video image is displayed, the shutter of the left lens of the shutter eyeglasses is opened and the shutter for the right lens is closed. As soon as the right video image is displayed, the shutter of the left lens of the shutter eyeglasses is closed and the shutter of the right lens is opened. After that, the liquid crystal panels 8 and the shutter eyeglasses 21 repeat this operation.

The left and right video images projected by the projector apparatus 1 are alternately switched at a predetermined timing and displayed on the screen 13. Accordingly, as shown in FIG. 4, it is ideally preferable that the shutter of the right lens of the shutter eyeglasses 21 is closed when the left video image is displayed and the shutter of the left lens of the shutter eyeglasses 21 is closed when the right video image is displayed.

Figure 5:
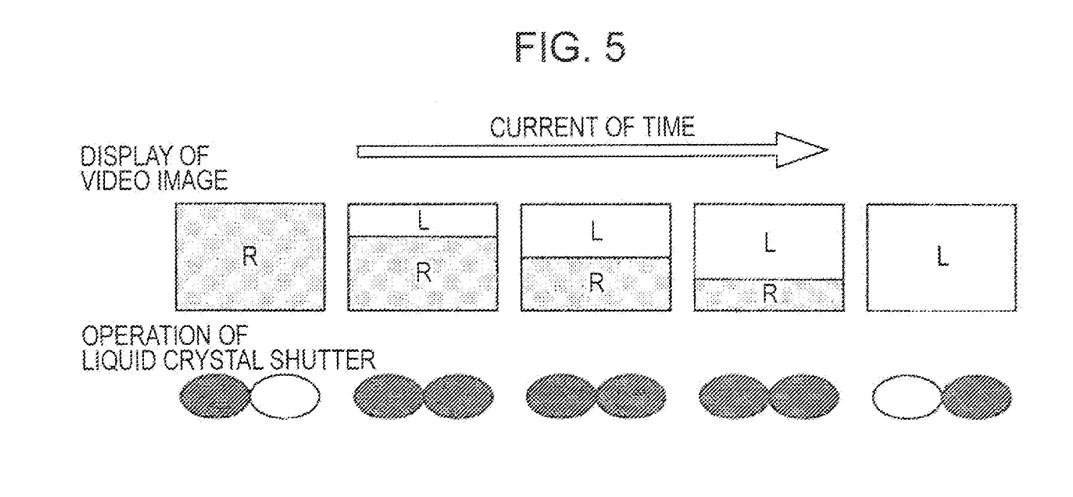
FIG. 5 illustrates an example of operation of liquid crystal shutters during a switchover from a right video image to a left video image according to the embodiment of the present disclosure.

FIG. 5 illustrates an example of operation of the liquid crystal shutters when a switchover from the right video image to the left video image is performed on the liquid crystal panels 8.

When a video image is displayed on a light modulating device such as the liquid crystal panels 8 of reflective or transmissive type, since the video image is rewritten vertically on a horizontal-line-by-horizontal-line basis from the upper side of the panel, the video image (for example, the left video image) 1 frame before and the video image (for example, the right video image) for the next frame may be present on a single screen.

When the projector apparatus 1 performs a switchover from the right video image to the left video image, the left video image is written from the upper side to the lower side. When the user sees the right video image and the left video image at the same time, the left and right video images are seen doubly. Since the video images seen by the user have blurred contour and their stereoscopic effects are lost, it is necessary to prevent the situation in which the left and right video images are visually recognized at the same time.

Figure 6A:
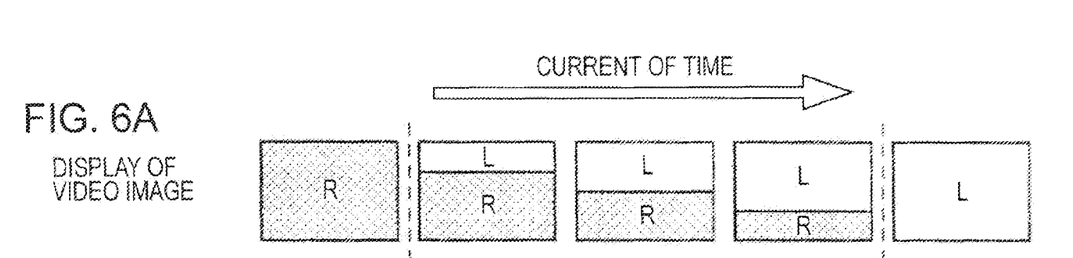
FIGS. 6A, 6B, and 6C illustrate examples of changing the brightness of the light source in response to a switchover between a left video image and a right video image according to the embodiment of the present disclosure.
Figure 6B:
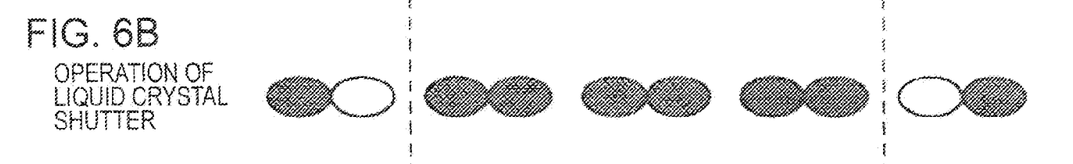
Figure 6C:
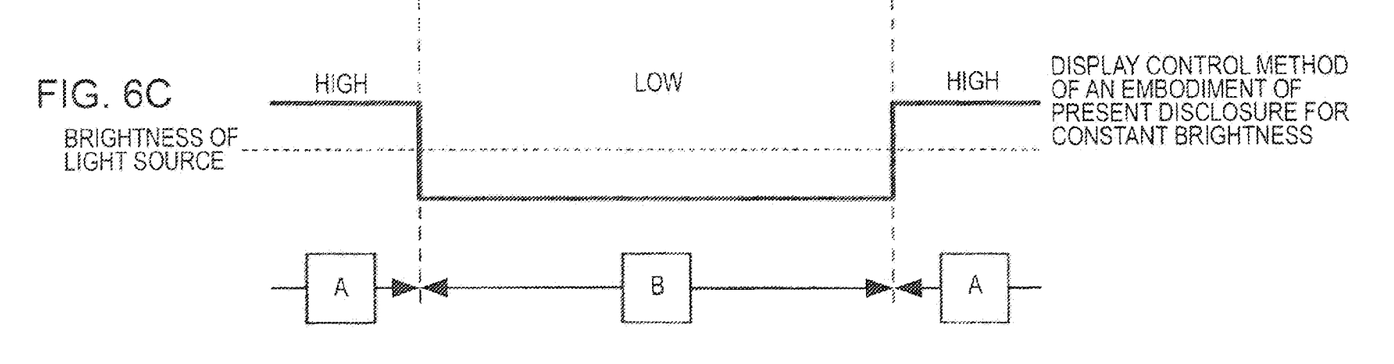

FIGS. 6A, 6B, and 6C show examples of changing the brightness of the light source 6 when a switchover from the right video image to the left video image is performed on the liquid crystal panels 8.

FIG. 6A shows an example of switchover from the right video image to the left video image on the liquid crystal panels 8.

FIG. 6B shows an example of driving the liquid crystal shutters of the left and right lenses of the shutter eyeglasses 21 according to the video image displayed on the liquid crystal panels 8.

FIG. 6C shows an example of controlling the brightness of the light source 6.

The projector apparatus 1 closes the liquid crystal shutters of the left and right lenses of the shutter eyeglasses 21 during a switchover between video images on the liquid crystal panels 8 to prevent the left video image and the right video image from being seen at the same time. Since no video image is displayed when the liquid crystal shutters of the shutter eyeglasses 21 are closed, the brightness of the light source 6 can be reduced while the user does not recognize reduction in the brightness.

Accordingly, the control unit 2 increases or reduces the brightness of the light source 6 in sync with the video image projected onto the screen 13 and the liquid crystal shutters of the shutter eyeglasses 21. In this example, the brightness of the light source 6 is increased in a period A in which the right video image is displayed, the brightness of the light source 6 is reduced in a period B equivalent to the duration of a switchover, and the brightness of the light source 6 is increased in a period A in which the left video image is displayed. This operation is repeated. When a switchover between the left and right video images has been completely performed, the operation of the light source 6 is controlled so that the brightness of the light source 6 becomes higher than in a light source of the related art. This enables the left and right video images to be brightened while keeping the power consumption of the light source 6 constant. Also, the power consumption of the light source 6 can be suppressed by keeping the brightness of the light source 6 in the period A constant and reducing the brightness of the light source 6 in the period B.

In the period B, the emission of the light source 6 may be stopped or only the brightness of the light source 6 may be reduced without the emission being stopped. Since the response rate of a light modulating device (such as the liquid crystal panels 8) is limited, the delay of a change in the video image based on the response rate can be included in the period B.

Figure 7A:
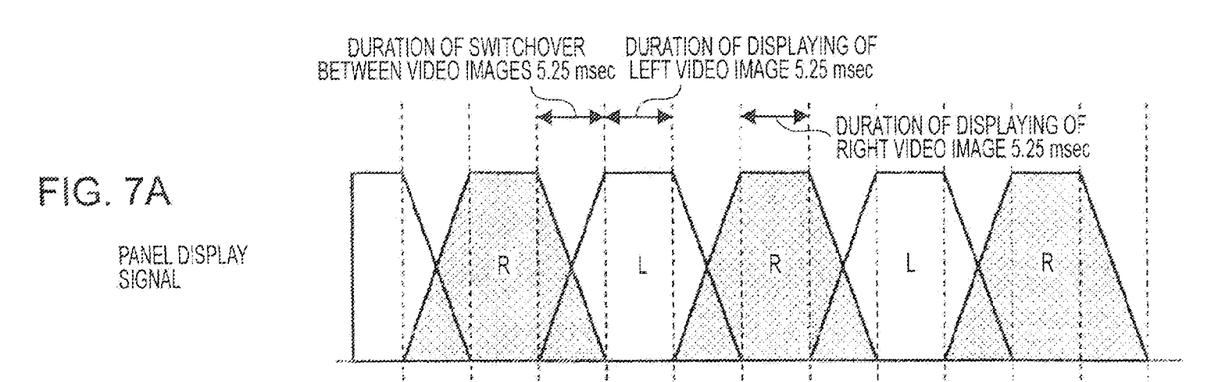
FIGS. 7A, 7B, and 7C illustrate a video signal displayed on the liquid crystal panel, the brightness of the light source, and an example of on/off operation of shutter eyeglasses when the liquid crystal response time is not considered in the embodiment of the present disclosure.
Figure 7B:
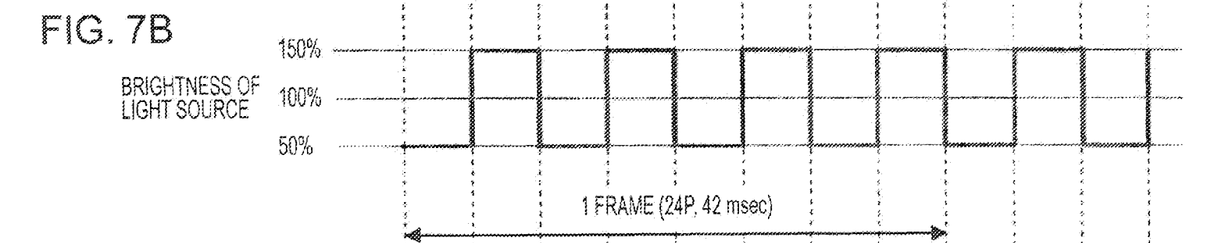
Figure 7C:
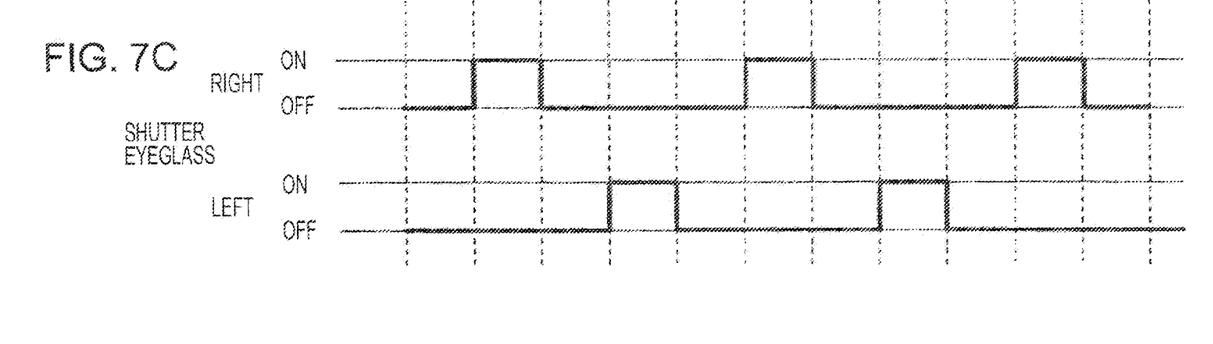

FIGS. 7A, 7B, and 7C are time charts showing the timing at which left and right video images are written to the liquid crystal panels 8 when 3D video signals are displayed at double speed, the timing at which the brightness of the light source 6 is controlled, and timing at which the left and right lenses of the shutter eyeglasses 21 are turned on or off.

FIG. 7A shows an example of displaying 3D image signals for the left video image and the right video image displayed on the liquid crystal panels 8.

FIG. 7B shows an example of controlling the brightness of the light source 6.

FIG. 7C shows an example of a switchover between turning on and off of the left and right lenses of the shutter eyeglasses 21.

Here, it is assumed that the video signal supports 24P time-division 3D video images and is a panel display signal that rewrites the liquid crystal panels 8. At this time, the control unit 2 instructs the panel driving unit 7 to alternately write the 3D video signals for the left video image and the right video image to the liquid crystal panel 8. It takes 5.25 milliseconds for the 3D display system 10 to switch the whole video image on the liquid crystal panels 8 between the left video image and the right video image. Accordingly, the output of the light source 6 is reduced to half the time-averaged value for 5.25 milliseconds, which is the time for a transition from one of the left and right video images to the other. This is because, if a discharge lamp is used as the light source 6, it is difficult to turn on the light source 6 immediately after it is turned off.

The brightness of the light source 6 is increased or reduced by the light source driving unit 5 in the range from 50% to 150% in which the time-average of the power consumed by the light source is almost constant, with respect to the time-averaged brightness of the light source 6. In this example, for 5.25 milliseconds for which the right video image is completely displayed on the liquid crystal panels 8, the brightness of the light source 6 increased to 150% and the right lens of the shutter eyeglasses 21 is turned on so that light passes through the right lens. Also for 5.25 milliseconds for which the left video image is completely displayed, the brightness of the light source 6 increased to 150% and the left lens of the shutter eyeglasses 21 is turned on so that light passes through the left lens. By changing the brightness of the light source 6 with time, the brightness of the video image is 1.5 times as large as that in the case where the brightness is constant (100%).

In the above 3D display system 10 of the embodiment, when display corresponding to time-division a 3D video image is performed, the control unit 2 reduces the brightness of the light source 6 until a switchover between the left video image and the right video image to be written to the liquid crystal panels 8 is completely done. On the other hand, when the left video image and the right video image have been completely written to the liquid crystal panels 8, the control unit 2 increases the brightness of the light source 6. Since the brightness of the light source 6 is increased or reduced at the timing of a switchover between the left video image and the right video image, it is possible to suppress crosstalk in which the left video image and the right video image are seen at the same time.

In addition, the control unit 2 instructs the light source driving unit 5 to increase or reduce the brightness of the light source 6 in the range from 50% to 150% when the normal brightness is assumed to be 100%. In this case, the brightness of 3D video images actually seen by the user can be 1.5 times as large as that of 3D video images of the related art. Accordingly, the brightness of time-division 3D video images can be increased. Since the liquid crystal shutters of the lenses of the shutter eyeglasses 21 are closed to reduce the brightness of the light source 6 during a switchover of the liquid crystal panels 8, crosstalk caused by light leakage can be suppressed.

The power consumed by the projector apparatus 1 can be suppressed by increasing the brightness of the light source 6 when a switchover between the left and right video images has been performed on the liquid crystal panels 8 and by reducing the brightness of the light source 6 when a switchover between the left and right video images is in progress. Accordingly, the brightness of 3D images can be increased while the power consumption of the light source 6 is kept at the almost the same value as in the light source of the related art.

2. Another Embodiment

[Example when the Liquid Crystal Response Time is Considered]

Next, an example of an application to a 3D display system 10' according to another embodiment of the present disclosure will be described below. In the description below, the same elements in FIG. 1 as in the embodiment described first may be denoted by like reference characters, and detailed descriptions may be omitted.

The 3D display system 10' has the same structure as 3D display system 10 of the embodiment described first, but the 3D display system 10' is different from the 3D display system 10 in that the 3D display system 10' considers the response time of the liquid crystal panels 8 during a switchover between left and right video images.

Figure 8A:
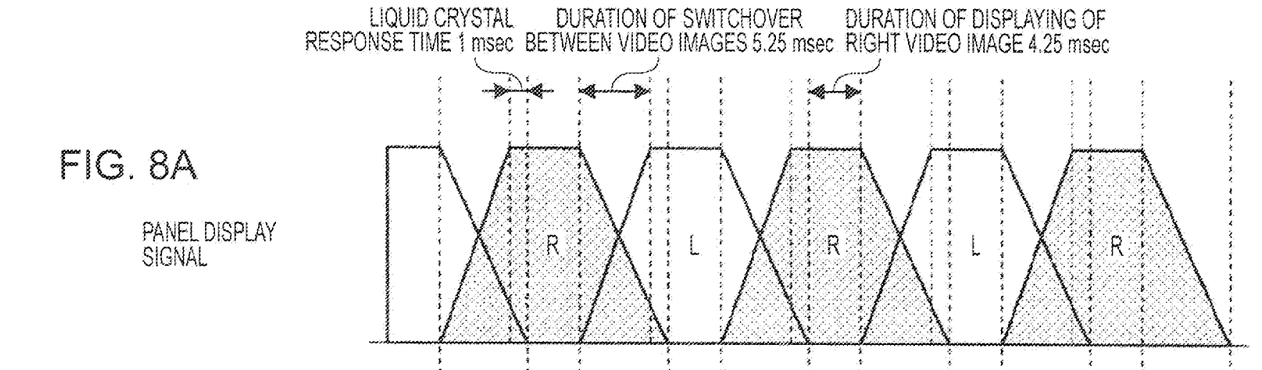
FIGS. 8A, 8B, and 8C illustrate a video signal displayed on the liquid crystal panel, the brightness of the light source, and an example of on/off operation of shutter eyeglasses when the liquid crystal response time is considered according to another embodiment of the present disclosure.
Figure 8B:
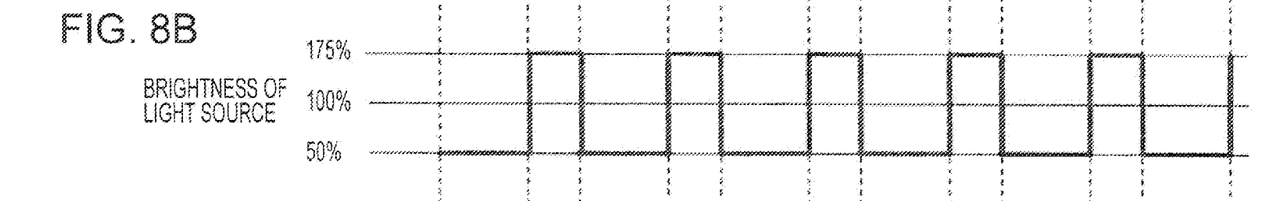
Figure 8C:
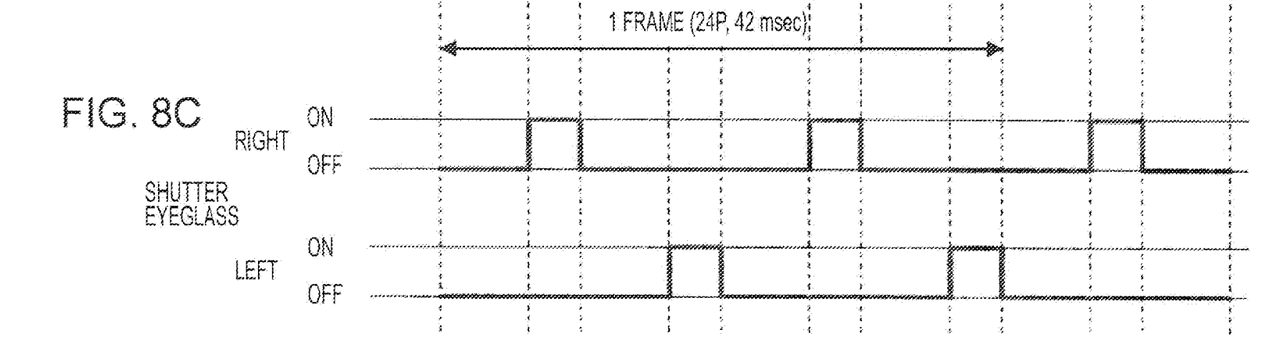

FIGS. 8A, 8B, and 8C are time charts showing the timing at which left and right video images are written to the liquid crystal panels 8 when a 3D video signal is displayed at double speed, the timing at which the brightness of the light source 6 is controlled, and the timing at which the left and right lenses of shutter eyeglasses 21 are turned of or off.

FIG. 8A shows an example of displaying 3D image signals for the left video image and the right video image displayed on the liquid crystal panels 8.

FIG. 8B shows an example of controlling the brightness of the light source 6.

FIG. 8C shows an example of a switchover between turning on and off of the left and right lenses of the shutter eyeglasses 21.

As shown in FIG. 8A, the response time of the liquid crystal panels 8 with respect to an inputted 3D video signal is 1 millisecond.

Here, it is assumed that the video signal supports 24P time-division 3D video signal and is a panel display signal that rewrites the liquid crystal panels 8. The light source driving unit 5 in this example increases the brightness of the light source 6 after a lapse of the response time (approximately 1 millisecond) of the liquid crystal panels 8 during a switchover between the left video image and the right video image.

In this example, the brightness of the light source 6 is increased or reduced by the light source driving unit 5 in the range from 50% to 175% in which a time-average value of power consumed by the light source 6 is almost constant, with respect to the time-averaged brightness of the light source 6. At this time, the control unit 2 increases the brightness of the light source 6 to 175% for 4.25 milliseconds for which the right video image is completely displayed on the liquid crystal panel 8, and turns on the liquid crystal shutter of the right lens of the shutter eyeglasses 21 so that light passes through the right lens. In addition, the control unit 2 increases the brightness of the light source 6 to 175% for 4.25 milliseconds for which the left video image is completely displayed on the liquid crystal panel 8, and turns on the liquid crystal shutter of the left lens of the shutter eyeglasses 21 so that light passes through the left lens. As a result, the brightness of the video image is 1.75 times as large as that in the case where the brightness of the light source 6 is constant (100%).

In the above 3D display system 10' of the other embodiment, the brightness of the light source 6 is controlled at the following timing. That is, in display corresponding to time-division 3D video image, during a switchover between video images on the liquid crystal panels 8, the brightness of the light source 6 is reduced to switch the video images for the response time of the liquid crystal panels 8 and the brightness of the light source 6 is increased at the timing at which the response time of the liquid crystal panels 8 expires.

More specifically, the control unit 2 reduces the brightness of the light source 6 until a switchover between the right video image and the left video image to be written to the liquid crystal panels 8 is completely done. At this time, the control unit 2 controls a switchover between the left video image and the right video image to be displayed on the liquid crystal panel 8 in consideration of a liquid crystal response time of 1 millisecond, which is the time after a driving voltage is applied to the liquid crystal panels 8 until the liquid crystal starts to operate. In the duration in which the left video image and the right video image overlap each other, crosstalk in which the left video image and the right video image are seen at the same time can be prevented by reducing the brightness of the light source 6 to 50%.

On the other hand, when the left video image and the right video image have been completely written to the liquid crystal panels 8, the control unit 2 increases the brightness of the light source 6. In this example, the duration in which the left and right lenses of the shutter eyeglasses 21 are turned on and light pass through the lenses is shorter by the liquid crystal response time. Here, the control unit 2 instructs the light source driving unit 5 to increase the brightness of the light source 6 to 175% in the duration in which the left or right video image is written solely in order to prevent the brightness of 3D video images displayed on the screen 13 from being reduced. The user can see the 3D image while checking a bright screen by increase or reduce the brightness of the light source 6 at a timing at which a switchover between the left video image and the right video image is performed.

3. Modification

In a 3D display system that similarly displays a right video image and left video image on the liquid crystal panels 8 in a time-division manner, a different polarization is provided for each of the right video image and left video image to be projected and an optical device with the transmittance polarization direction corresponding to the polarization may be used in the shutter eyeglasses.

In the above embodiments, the brightness of the light source 6 is adjusted to 50% to 150% or 50% to 175%, but the present disclosure is not limited to these ranges or the 3D video signal for which one frame is 24 P. In addition, the contrast of high brightness and low brightness may be increased.

As long as the power consumption of the light source 6 is kept constant, a common high pressure mercury vapor lamp, light emitting diode (LED), or laser diode may be used as the light source 6 for projectors.

The present disclosure is not limited to the above embodiments and it will be clear that various modifications may be made without departing from the scope of the disclosure.

The present disclosure contains subject matter related to that disclosed in Japanese Priority Patent Application JP 2010-254145 filed in the Japan Patent Office on Nov. 12, 2010, the entire contents of which are hereby incorporated by reference.

What is claimed is:

1. A display control circuit comprising:
    a device driving unit that alternately writes a left video image for a left eye and a right video image for a right eye in a time-division manner to a light modulating device, based on a time-division stereoscopic video data having the left video image and the right video image;
    a light source driving unit that increases or reduces the brightness of a light source that emits light passing through the light modulating device;
    a shutter eyeglass driving unit that provides shutter eyeglasses for which liquid crystal shutters are opened or closed by a shutter driving signal with the shutter driving signal; and
    a control unit that instructs the light source driving unit to reduce the brightness of the light source in the duration of a switchover between the left video image and the right video image for the light modulating device or instructs the light source driving unit to increase the brightness of the light source in the duration in which the left video image or the right video image is written solely to the light modulating device,
    wherein the light source driving unit increases the brightness of the light source after a lapse of the response time of the light modulating device during a switchover between the left video image and the right video image.

2. A display control circuit comprising:
    a device driving unit that alternately writes a left video image for a left eye and a right video image for a right eye in a time-division manner to a light modulating device, based on a time-division stereoscopic video data having the left video image and the right video image;
    a light source driving unit that increases or reduces the brightness of a light source that emits light passing through the light modulating device;
    a shutter eyeglass driving unit that provides shutter eyeglasses for which liquid crystal shutters are opened or closed by a shutter driving signal with the shutter driving signal; and
    a control unit that instructs the light source driving unit to reduce the brightness of the light source in the duration of a switchover between the left video image and the right video image for the light modulating device or instructs the light source driving unit to increase the brightness of the light source in the duration in which the left video image or the right video image is written solely to the light modulating device, wherein the brightness of the light source is increased or reduced by the light source driving unit in the range from 50% to 175% in which a time-average value of power consumed by the light source is almost constant, with respect to the time-averaged brightness of the light source.

3. The display control circuit of claim 2, wherein the light modulating device is a liquid crystal panel of transmissive type.

4. The display control circuit of claim 2, wherein the shutter driving signal provided by the shutter eyeglass driving unit is transmitted to the shutter eyeglasses by wire.

5. A projector apparatus comprising:
a light source that emits light to be projected onto a screen;
a light modulating device to which a left video image for a left eye and a right video image for a right eye are alternately written in a time-division manner on the basis of a time-division stereoscopic video data including the left video image and the right video image;
a device driving unit that writes the left video image and the right video image to the light modulating device;
a lens that enlarges a video image represented by light originating from the light source and passing through the light modulating device, at a predetermined magnification;
a light source driving unit that increases or reduces the brightness of the light source;
a shutter eyeglass driving unit that provides shutter eyeglasses for which liquid crystal shutters are opened or closed by a shutter driving signal with the shutter driving signal; and
a control unit that instructs the light source driving unit to reduce the brightness of the light source in the duration of a switchover between the left video image and the right video image for the light modulating device or instructs the light source driving unit to increase the brightness of the light source in the duration in which the left video image or the right video image is written solely to the light modulating device,
wherein the light source driving unit increases the brightness of the light source after a lapse of the response time of the light modulating device during a switchover between the left video image and the right video image.

6. The display control circuit of claim 5, wherein the light modulating device is a liquid crystal panel of transmissive type.

7. The display control circuit of claim 5, wherein the shutter driving signal provided by the shutter eyeglass driving unit is transmitted to the shutter eyeglasses by wire.

8. The display control circuit of claim 5, wherein the light modulating device is a liquid crystal panel of reflective type.

9. The display control circuit of claim 5, wherein the shutter driving signal provided by the shutter eyeglass driving unit is transmitted to the shutter eyeglasses by wireless.

10. The display control circuit of claim 1, wherein the light modulating device is a liquid crystal panel of transmissive type.

11. The display control circuit of claim 1, wherein the shutter driving signal provided by the shutter eyeglass driving unit is transmitted to the shutter eyeglasses by wire.

12. The display control circuit of claim 1, wherein the light modulating device is a liquid crystal panel of reflective type.

13. The display control circuit of claim 1, wherein the shutter driving signal provided by the shutter eyeglass driving unit is transmitted to the shutter eyeglasses by wireless.

14. The display control circuit of claim 2, wherein the light modulating device is a liquid crystal panel of reflective type.

15. The display control circuit of claim 2, wherein the shutter driving signal provided by the shutter eyeglass driving unit is transmitted to the shutter eyeglasses by wireless.

16. A projector apparatus comprising:
a light source that emits light to be projected onto a screen;
a light modulating device to which a left video image for a left eye and a right video image for a right eye are alternately written in a time-division manner on the basis of a time-division stereoscopic video data including the left video image and the right video image;
a device driving unit that writes the left video image and the right video image to the light modulating device;
a lens that enlarges a video image represented by light originating from the light source and passing through the light modulating device, at a predetermined magnification;
a light source driving unit that increases or reduces the brightness of the light source;
a shutter eyeglass driving unit that provides shutter eyeglasses for which liquid crystal shutters are opened or closed by a shutter driving signal with the shutter driving signal; and
a control unit that instructs the light source driving unit to reduce the brightness of the light source in the duration of a switchover between the left video image and the right video image for the light modulating device or instructs the light source driving unit to increase the brightness of the light source in the duration in which the left video image or the right video image is written solely to the light modulating device,
wherein the brightness of the light source is increased or reduced by the light source driving unit in the range from 50% to 175% in which a time-average value of power consumed by the light source is almost constant, with respect to the time-averaged brightness of the light source.

17. The display control circuit of claim 16, wherein the light modulating device is a liquid crystal panel of transmissive type.

18. The display control circuit of claim 16, wherein the shutter driving signal provided by the shutter eyeglass driving unit is transmitted to the shutter eyeglasses by wire.

19. The display control circuit of claim 16, wherein the light modulating device is a liquid crystal panel of reflective type.

20. The display control circuit of claim 16, wherein the shutter driving signal provided by the shutter eyeglass driving unit is transmitted to the shutter eyeglasses by wireless.

* * * * *